United States Patent

[11] 3,587,882

| [72] | Inventors | Philip L. Friday;<br>David G. Friday, R.R. 02, Hartford Township, Van Burne County, Mich. 49057 |
|---|---|---|
| [21] | Appl. No. | 838,418 |
| [22] | Filed | July 2, 1969 |
| [45] | Patented | June 28, 1971 |

[54] LIFTING AND TRANSPORTING APPARATUS
11 Claims, 10 Drawing Figs.

[52] U.S. Cl. .................................................. 214/75, 214/672
[51] Int. Cl. ........................................................ B60p 1/44
[50] Field of Search ........................................... 214/75, 660, 670, 674; 280/423

[56] References Cited
UNITED STATES PATENTS

| 2,980,269 | 4/1961 | Zimmerman | 214/75 |
| 3,045,853 | 7/1962 | Card | 214/672 |
| 3,259,257 | 7/1966 | Brown et al. | 214/75 |
| 3,432,053 | 3/1969 | Vereschagin | 214/505 |

FOREIGN PATENTS

| 1,148,019 | 7/1957 | France |
| 1,376,851 | 9/1964 | France |
| 1,272,141 | 7/1968 | Germany |

*Primary Examiner*—Gerald M. Forlenza
*Assistant Examiner*—Raymond B. Johnson
*Attorney*—Woodhams, Blanchard & Flynn ABSTRACT: An apparatus for lifting and transporting objects, such as pallet-type fruit boxes and/or industrial parts bins, comprising a steerable tractor unit having a forklift mechanism mounted thereon. A trailer unit having a load-receiving bed is coupled to the tractor unit to permit relative pivotal movement therebetween about a vertical axis whereby the forklift mechanism can be positioned in sidewardly or frontwardly extending positions relative to the trailer unit for picking up the objects and can be pivoted to a position over the bed of the trailer unit for depositing the objects thereon.

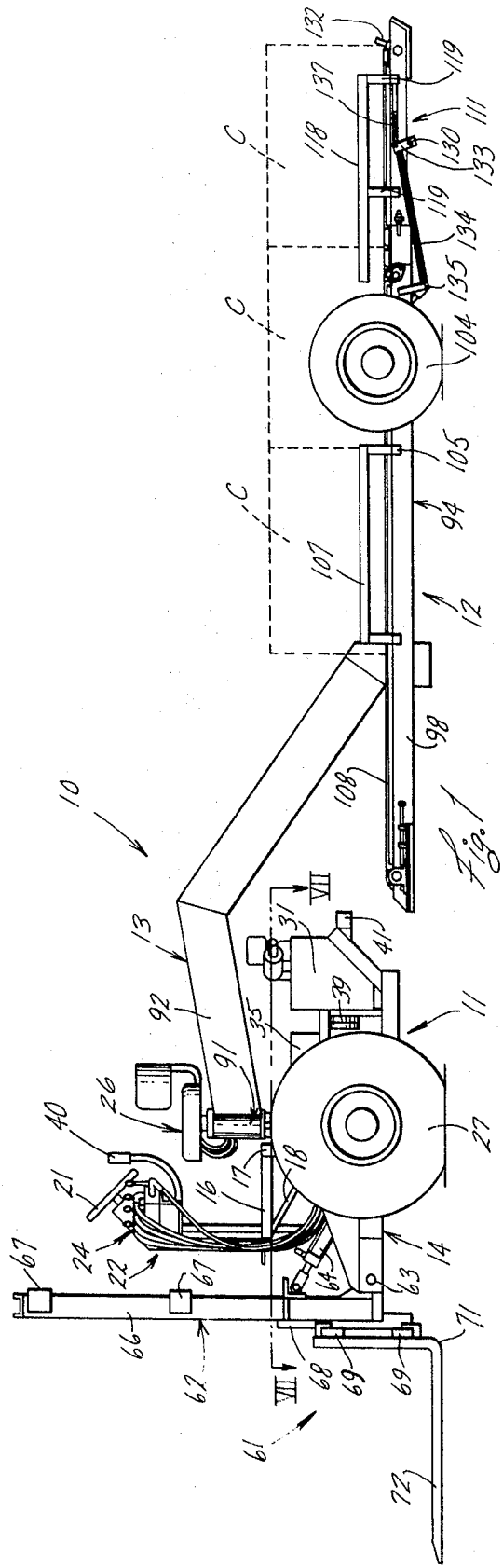

INVENTORS
PHILIP L. FRIDAY
DAVID G. FRIDAY
BY
Woodhams Blanchard & Flynn
ATTORNEYS INVENTORS
PHILIP L. FRIDAY
DAVID G. FRIDAY
BY Woodhams, Blanchard & Flynn
ATTORNEYS

PATENTED JUN28 1971          3,587,882

INVENTORS
PHILIP L. FRIDAY
DAVID G. FRIDAY
BY
Woodhams, Blanchard & Flynn
ATTORNEYS

LIFTING AND TRANSPORTING APPARATUS

FIELD OF THE INVENTION

This invention relates to a lifting and transporting apparatus and, more particularly, relates to a lifting and transporting apparatus which includes a forklift mechanism which can be moved about a vertical axis so that it can be placed in a variety of positions in which it can raise and lower loads. The apparatus also includes a storage and conveyor portion so that loads can be placed thereon.

BACKGROUND OF THE INVENTION

It is conventional to place large numbers of relatively small objects in various types of pallet-type containers and then move and/or stack the containers by means of forklift trucks. One particular example of this involves the handling of freshly picked fruit, such as apples. The apples are ordinarily placed in forkliftable lug boxes after they are picked. The lug boxes are usually located between adjacent trees in the orchard. Relatively narrow lanes or aisles are provided in the orchard so that a conventional forklift truck can be driven therealong in order to pick up the filled lug boxes and transport them from the orchard, for example, to a flatbed highway truck for further transportation to a location for subsequent processing.

Such techniques are generally satisfactory but it has been found that they require an excessive amount of equipment and/or an unnecessarily extensive use thereof. Further, such techniques are difficult to carry out under certain circumstances. For example, it has become common to space fruit trees relatively close to each other in one direction, either lengthwise or widthwise, of the orchard so that there is relatively little room to maneuver the forklift truck when it is desired to pick up a filled lug box positioned between closely adjacent trees. Consequently, a great amount of jockeying is involved in loading and transporting a number of lug boxes. Further, according to common practices, the lug boxes are individually transported either to the highway truck or at least to a location where they can be stacked. This involves an unnecessary amount of time and use of equipment. Thus, there exists a need for a highly maneuverable lifting and transporting apparatus which can pick up and move a plurality of containers, such as lug boxes, which are positioned in hard-to-reach places, on possibly uneven terrain, and which will also provide a storage capability so that a plurality of such containers can be picked up in succession and moved as a group to a place for storage or subsequent transportation.

It is a principal object of this invention to provide a lifting and transporting apparatus which will meet the aforementioned need.

It is another object of this invention to provide an improved lifting and transporting apparatus which is equipped with a forklift-type of load raising and lowering mechanism, which mechanism can be easily moved about a vertical axis so that it can be positioned in any desired location for picking up and lowering loads, the forklift mechanism being associated with a load-receiving and storing unit so that a plurality of containers can be placed on said unit in succession during a single movement of the apparatus through the work area, such as an orchard.

It is a further object of this invention to provide an improved lifting and transporting apparatus, as aforesaid, in which the forklift mechanism is mounted on a steerable tractor unit so that the tractor unit can be steered into any desired position for picking up and lowering loads, including a position in which the forklift mechanism is disposed over the storage bed of a trailer unit so that loads can be placed thereon.

It is a further object of this invention to provide an improved lifting and transporting apparatus, as aforesaid, in which the tractor unit includes a self-contained engine mounted on the opposite end of the tractor unit frame from the forklift mechanism so as to serve as a counterbalance therefor, whereby the tractor unit will be stable and reliable in operation.

It is a further object of this invention to provide an improved lifting and transporting apparatus, as aforesaid, in which the trailer unit includes an elongated bed having conveying means thereon whereby a plurality of containers can be placed thereon in succession and moved toward the rearward end of the trailer unit.

It is a further object of this invention to provide an improved lifting and transporting apparatus, as aforesaid, in which the trailer unit has an upwardly and downwardly movable tailgate portion having automatically retractable stop means thereon so that, in the raised position of the tailgate portion, the stop means engage the rearwardmost container on the trailer unit and prevent same from moving off the bed, the stop means being automatically retracted when the tailgate portion is dropped whereby the containers are then free to move off the tailgate portion of the trailer unit.

SUMMARY OF THE INVENTION

According to the invention, there is provided a lifting and transporting apparatus comprising a self-propelled, steerable tractor unit equipped with a set of driving, ground-engaging wheels whereby the tractor unit can be moved along the ground and can be steered in any desired direction. A forklift unit is mounted on the front end of the tractor unit and can be moved with the tractor unit into a variety of selectable positions so as to pick up and deposit containers. A trailer unit is connected to the tractor unit so that it can be pulled or pushed thereby. The trailer unit is mounted for relative pivotal movement with respect to the tractor unit about a vertical axis so that the tractor unit can be moved between sidewardly and frontwardly extending positions without effecting corresponding movement of the trailer unit. The trailer unit has a load-receiving bed and the forklift unit can be positioned over said bed in order to deposit containers thereon.

BRIEF DESCRIPTION OF THE DRAWINGS

A preferred embodiment of the invention is illustrated in the accompanying drawings, in which:

FIG. 1 is a side elevational view of the lifting and transporting apparatus according to the present invention.

FIG. 2 is a top plan view of the lifting and transporting apparatus.

DESCRIPTION OF THE PREFERRED EMBODIMENTS

Figure 3:
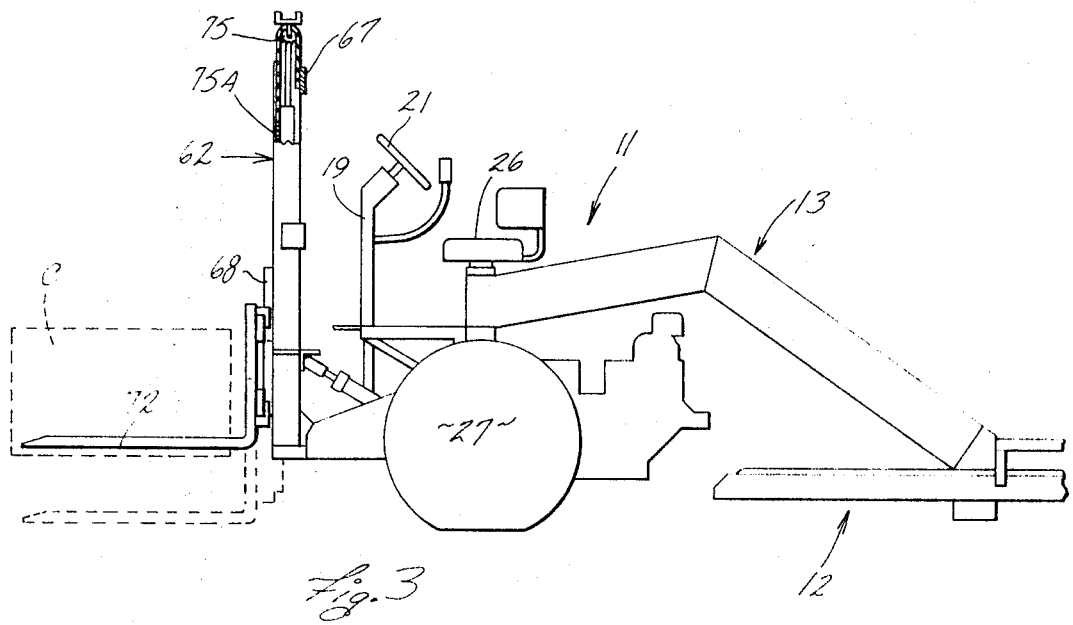
FIG. 3 is a schematic view of a fragment of FIG. 1 and showing different positions of the forklift mechanism when it is picking up containers.

Referring to the drawings, the lifting and transporting apparatus 10 is comprised of a tractor unit 11 and a trailer unit 12. The tractor unit 11 is pivotally connected to the trailer unit 12 by means of a connecting beam 13, as hereinafter further described, whereby the tractor unit can be pivoted about a vertical axis with respect to the trailer unit.

The tractor unit 11 is comprised of a frame 14 which can be made in any suitable manner from structural members, such as rectangular tubes, channels, angles, bars and plates, so as to provide a rigid support for the parts about to be described. A horizontal platform 16 is supported on the frame 14 by means of legs 17 and braces 18. A post 19 extends upwardly from the frame 14 and supports a steering wheel 21. A control console 22 is mounted on a bracket 23 (FIG. 2) which extends sidewardly from the post 19 adjacent its upper end. The control console is comprised of a series of manually operable valves 24 for selectively supplying pressure fluid to the cylinders and fluid pressure motors described below. A driver's seat 26 is supported in position so that the driver can conveniently manipulate the steering wheel 21 and the valves 24.

The tractor unit 11 is steerable and is self-propelled. For this purpose, a pair of driving wheels 27 are supported on the main frame 14 and provide support therefor. The drive shafts 28 (FIG. 6) for the driving wheels 27 are mounted in an axle housing 29 and said shafts are driven from a conventional differential 30. The axle housing 29 and differential structure 30 can comprise any suitable, conventional commercially available drive axle construction and, hence, do not require detailed description.

Figure 10:
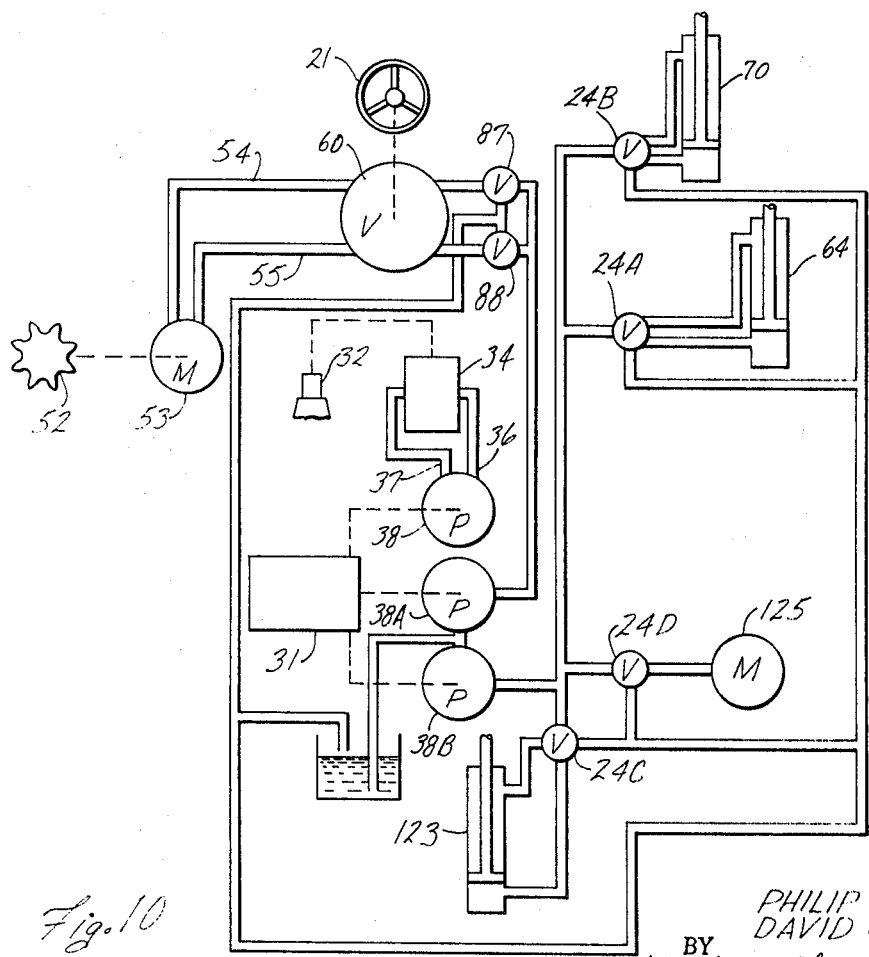
FIG. 10 is a schematic diagram of the hydraulic control circuit.

The input shaft 32 (FIGS. 6 and 7) of the differential 30 is driven by a chain and sprocket drive 33 from a hydrostatic transmission 34. The hydrostatic transmission 34 can be of any suitable, conventional commercially available type and does not require detailed description. Operating fluid for the hydrostatic transmission 34 is supplied by conduits 36 and 37 from a pump 38. The pump 38 is driven from an internal combustion engine 31 by means of the belt drive 39. Pumps 38A and 38B (FIG. 10) are also driven by the engine 31 and supply operating fluid for the other fluid-pressure-operated mechanisms described hereinafter. A battery 35 is mounted on the frame 14 for starting the engine 31 and various other purposes.

By utilizing a hydrostatic transmission 34, it is not necessary to provide the usual clutch, change speed transmission and brakes. Equal forward and reverse speeds can be obtained. The hydrostatic transmission 34 can be moved between forward, neutral and reverse settings by a control lever 40 (FIGS. 1 and 2).

The engine 31 is mounted on the main frame 14 of the tractor unit 11 and is positioned rearwardly of and below the driver's seat 26 in order to counterbalance the weight of the forklift apparatus, hereinafter further described, to provide stability for the tractor unit. If desired or necessary, an additional weight, such as a massive beam 41, can be mounted on the frame 14 rearwardly of the engine for additional counterbalancing purposes.

Figure 6:
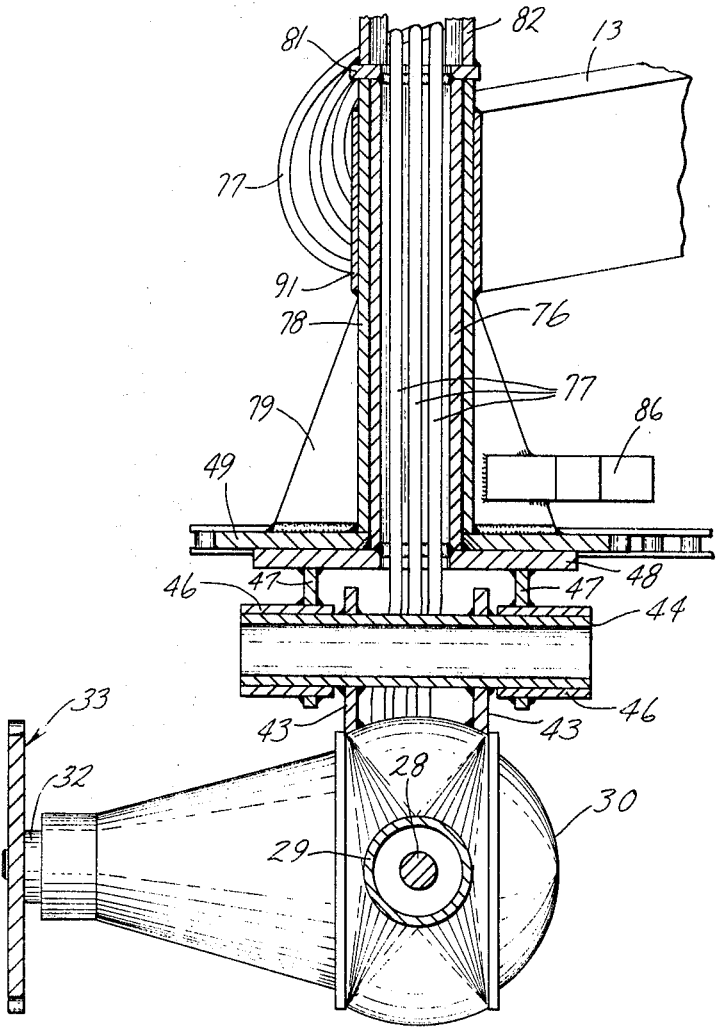
FIG. 6 is a sectional view through the post portion of the tractor unit, substantially as taken along the line VI—VI of FIG. 7.

Referring to FIG. 6, the differential 30 is affixed by a pair of hangers 43 to a centrally located tubular shaft 44 which extends horizontally and perpendicular to the axis of rotation of the wheel drive shafts 28. The opposite ends of the shaft 44 are pivotally supported by relatively short tubular supports 46, which supports 46 are connected by brackets 47 to a plate 48. The plate 48 is secured, as by bolting or by welding, to a member 45 (FIG. 8) of the frame 14 of the tractor unit whereby the axle housing and differential are supported on said main frame and are pivotable relative thereto about the axis of shaft 44. The wheels 27 can thus raise and lower about the axis of the shaft 44 to accommodate uneven terrain. However, the entire frame 14 and the wheels 27 are movable as a unit about a vertical axis with respect to the trailer unit 12 for steering purposes.

Figure 4:
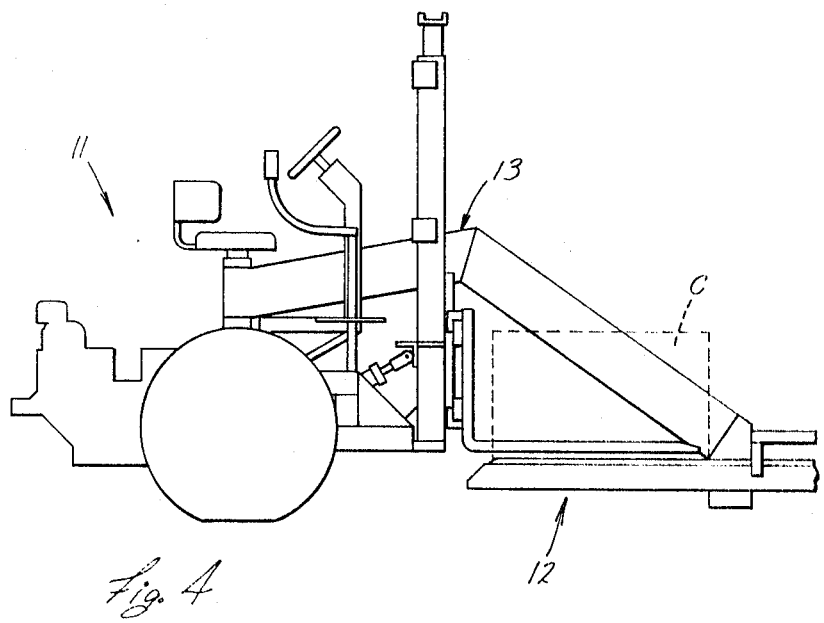
FIG. 4 is a view similar to FIG. 3 and showing the position of the tractor unit when the forklift mechanism is depositing a container onto the trailer unit.
Figure 7:
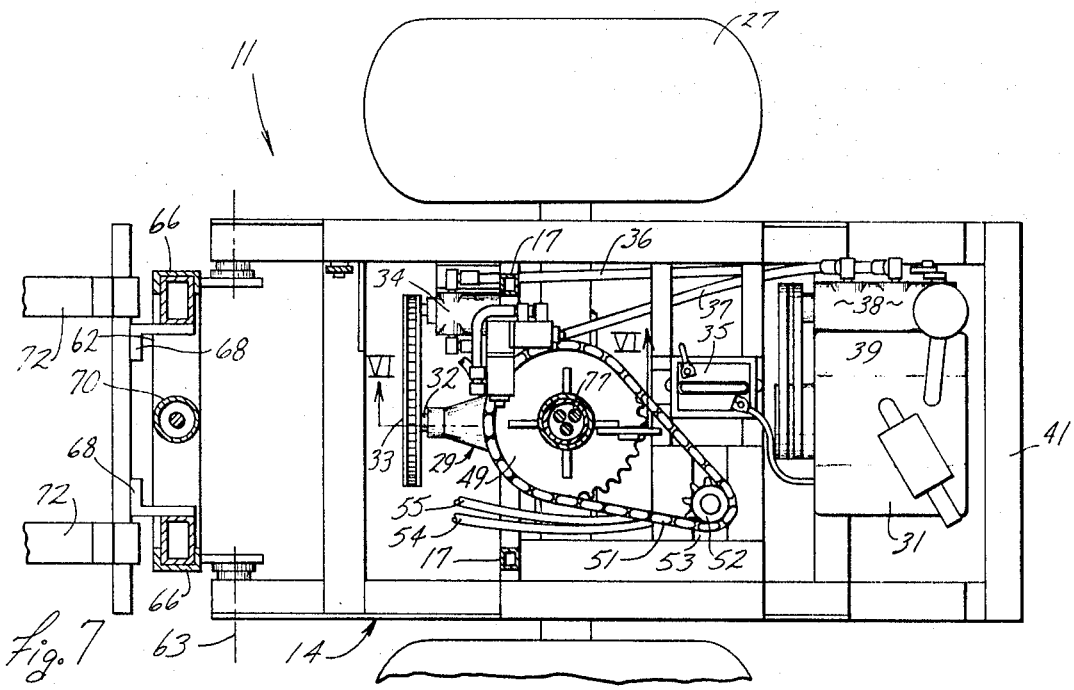
FIG. 7 is a simplified sectional view substantially as taken along the line VII—VII of FIG. 1.
Figure 8:
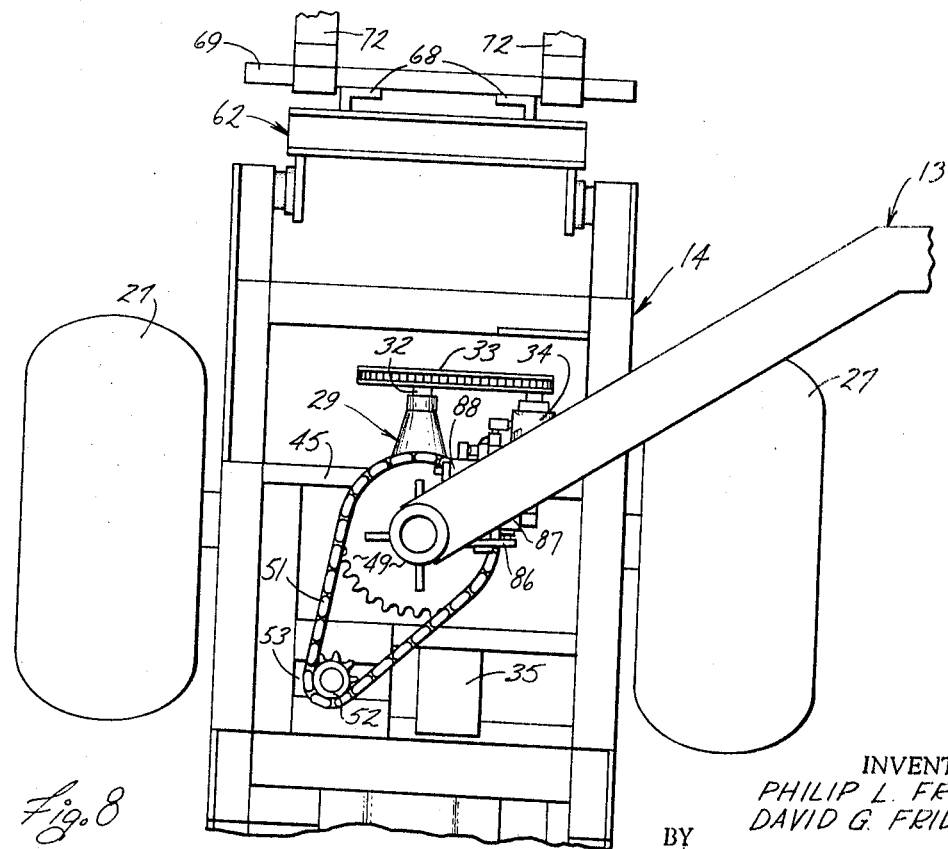
FIG. 8 is a schematic view of the frame of the tractor unit in the position in which the forklift mechanism extends sidewardly with respect to the trailer unit.
Figure 9:
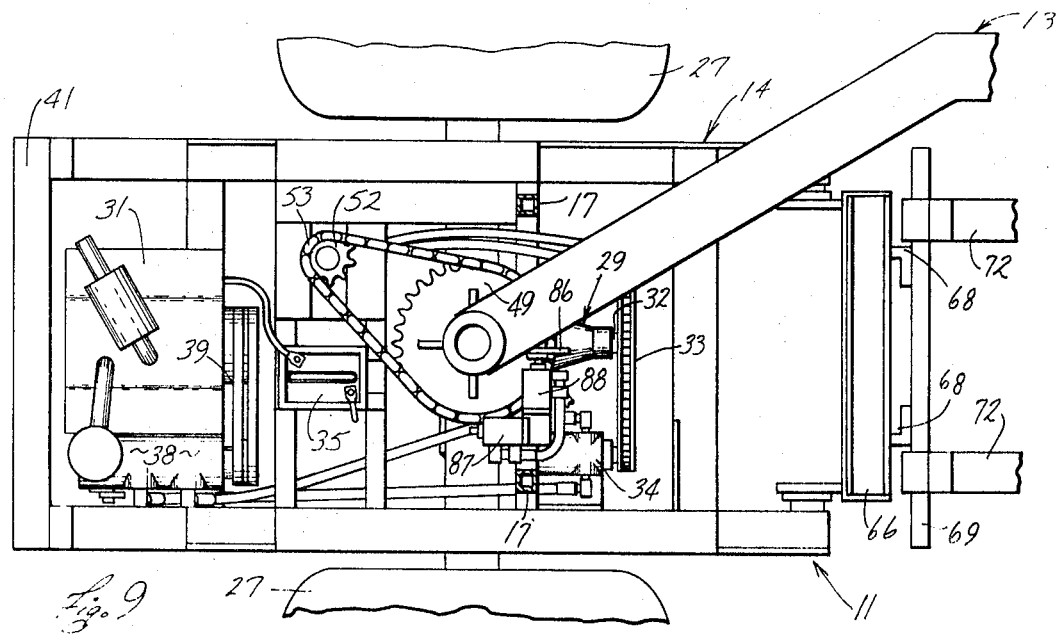
FIG. 9 is a schematic view similar to FIG. 8 showing the position of the tractor unit frame after it has been moved through an angle of about 270° with respect to the FIG. 8 position so that the liftfork mechanism is positioned over the bed of the trailer unit.

A horizontal sprocket member 49 rests on the upper surface of the plate 48, the plate 48 being rotatable with respect to the sprocket member 49. Lubricant can be supplied between the confronting surfaces of the sprocket member 49 and the plate 48 to facilitate such movement. Also, if desired, suitable bearing means could be provided therebetween. The sprocket member 49 is affixed to the trailer unit 12 at the end of the connecting beam 13 in a manner to be described hereinbelow. The sprocket 49 is engaged by a chain 51 (FIG. 7), which chain also engages a relatively small driven sprocket 52. The driven sprocket 52 is rotated by means of a fluid-pressure-operated motor 53 in response to movement of the steering wheel 21. Because sprocket 49 is affixed to the trailer unit 12, rotation of the driven sprocket 52 causes same to move or walk along the chain 51 to thereby cause pivotal movement of the main frame 14 and the entire tractor unit 11 about the vertically extending axis of the sprocket 49. FIGS. 7, 8 and 9 illustrate three different positions of the sprocket 52 and the frame 14 with respect to the stationary sprocket member 49. FIG. 7 shows the position of the parts when the forklift mechanism extends forwardly as shown in FIG. 1, FIG. 8 shows the position of the parts when the forklift mechanism extends sidewardly and FIG. 9 shows the position of the parts when the forklift mechanism is positioned over the trailer unit as shown in FIG. 4.

Fluid pressure for operating and driving motor 53 for the sprocket 52 is supplied through a pair of conduits 54 and 55 which extend from the steering wheel. The steering wheel 21 is coupled to a conventional valve mechanism 60 (FIG. 9) for controlling the flow of pressure fluid through the conduits 54 and 55 in order to control operation of the motor 53.

The forklift mechanism 61 is mounted on the front end of the frame of the tractor unit 11 at a position opposite that of the engine. The forklift mechanism 61 can be a conventional type. In the illustrated embodiment, it comprises a mast assembly 62 which desirably is mounted for pivotal movement about an axis 63 (FIG. 1) with respect to the frame 14 of the trailer unit 11 so that said mast assembly can be pivoted between a vertical and a rearwardly inclined position. A piston and cylinder unit 64 is coupled between the mast assembly 62 and the main frame 14 for effecting tilting of the mast assembly. Supply of fluid pressure to the cylinder 64 is controlled by one of the valves 24, such as the valve 24A (FIG. 9).

The mast assembly 62 is comprised of a pair of opposed channels 66 which are rigidly attached to vertically spaced transverse brace members 67. A rectangular subframe 68 is mounted for vertical sliding movement within the channels and said subframe supports at its lower end crossbars 69. A pair of L-shaped members 71 are hooked to the crossbars 69. The lower generally horizontal legs of the members 71 define the fork tines 72.

The subframe 68 can be raised and lowered by suitable actuation means, such as a piston and cylinder assembly 70 which is disposed between the channels 66. The fluid pressure supply to the piston and cylinder assembly 70 can be controlled by another one of the valves 24, such as the valve 24B (FIG. 9). If desired, the valve 24B can be operated by foot pedals, instead of by hand. The actuation means may be coupled to the subframe 68 by means of idler pulleys 75 and chains 75A in a conventional fashion.

Referring to FIG. 6, a tube 76 is affixed, as by welding, to the plate 48 and extends upwardly therefrom. Conduits 77 for supplying operating fluid to the mechanisms mounted on the trailer unit 12 extend upwardly through the tube 76 and thence pass outwardly therefrom along the connecting beam 13. It will be noted that there is sufficient slack in the conduits 77 to permit pivotal movement of tube 76 with respect to beam 13. A further tube 78 is secured, as by welding, to the stationary sprocket member 49 and extends upwardly therefrom coaxial with and surrounding the tube 76. Triangular brace plates 79 are secured, as by welding, to the tube 78 and to the stationary sprocket member 49 to provide reinforcement thereof. A ring 81 is secured to the upper end of the inner tube 76 and extends outwardly therefrom over the upper end of the outer tube 78. The ring 81 is not attached to the outer tube 78 and said ring and the inner tube 76 can rotate with respect to said outer tube. A seat support tube 82 extends upwardly from the ring 81 and the seat 26 is supported thereon so that the seat is, in effect, supported on the main frame 14 of the tractor unit 11 and moves therewith about the vertical center axis of the outer tube 78.

One of the brace plates 79 has an actuator bar 86 projecting therefrom. When the tractor unit 11 is moved to the position shown in solid lines in FIG. 8, an actuator for a valve mechanism 87 is mounted on said tractor unit 11 and engages the actuator bar 86 and this terminates flow of operating fluid to the steering valve 60 whereby further pivotal movement of the tractor unit in one direction (clockwise in FIG. 8) is prevented. Similarly, when the tractor unit is pivoted approximately 270° counterclockwise into the position shown in FIG. 9, a second valve mechanism 88 will be actuated by the actuator bar 86 in order to disconnect the steering valve 60 from the pressure source therefor, whereby further movement of the drive sprocket 52 in that direction (counterclockwise in FIG. 9) will be prevented. Thus, the tractor unit 11 can be pivoted with respect to the stationary sprocket member 49 and the tube 78 through an arc of approximately 270° so that loads can be picked up or deposited on either side of or in front of the apparatus. However, the forklift mechanism and any load supported thereon cannot be moved under the beam 13. Thus, a load supported on the forklift mechanism cannot be moved into contact with the connecting beam 13.

The connecting beam 13 has an end portion 91 which is fixedly secured, as be welding, to the outer tube 78 between the upper ends of the brace plates 79 and the ring 81. Thus, the connecting beam 13, the outer tube 78 and the sprocket member 49 form a rigid assembly and the entire tractor unit 11 is pivotal with respect thereto about the central axis of the tube 78.

The connecting beam 13 is comprised of a straight front section 92 which is inclined upwardly at a small angle and which also extends rearwardly and to a position laterally outwardly of one of the sides of the trailer unit 12. The connecting beam also has a straight downwardly and rearwardly inclined rear section 92 which extends to adjacent the frame of the trailer unit. The front section 92 of the connecting beam 13 is of sufficient length and is so arranged that the engine can move therebeneath without interference therewith, whereby the tractor unit 11 can pivot with respect to the connecting beam 13 through the approximately 270° angle as described above.

The trailer unit 12 is comprised of a frame 94 which is constructed of a pair of main longitudinally extending frame members 97 and 98 which can be made of rectangular tube stock. A main transverse frame member 99 extends between the longitudinal frame members 97 and 98 and is secured thereto in any suitable manner, such as by welding. The main transverse frame member 99 has a sideward extension 101 to which is rigidly attached the lower end of the rear section 93 of the connecting beam 13. A further transverse frame member 102 extends between the longitudinal frame members 97 and 98. Ground-engaging wheels 103 and 104 are rotatably mounted on lateral extensions of the transverse frame member 102 whereby the trailer unit is supported thereby for movement. The transverse frame member 102 can be made hollow to serve as a reservoir for the hydraulic fluid for the fluid pressure circuit, if desired. Horizontal guide rails 106 and a07 are supported by L-shaped brackets 105 in laterally and vertically offset relation with respect to the longitudinal frame members 97 and 98 so as to prevent movement of the containers off the trailer unit 12 and to guide movement thereof toward the rearward end of the trailer unit. Endless conveying chains 108 and 109 are mounted on the frame members 97 and 98 for lengthwise movement therealong. The upper reaches of the conveyor chains 108 and 109 are arranged above said longitudinal frame members 97 and 98 and are movable rearwardly whereby containers placed on the front end of the trailer unit 12 can be moved by the chains toward the rearward end thereof.

The trailer unit 12 has a tailgate section 111 positioned rearwardly of the ground-engaging wheels 103 and 104 and mounted for pivotal movement about the horizontal axis of a shaft 112. The frame of the tailgate section 111 is comprised of longitudinal frame members 113 and 114 which are connected together by transverse frame members 115 and 116. Guide rails 117 and 118 are supported in laterally and vertically upwardly offset relationship to the longitudinal frame members by L-shaped brackets 119. The longitudinal frame members 113 and 114 are pivotally mounted on the shaft 112 by means of mounting brackets 121. A crank arm 122 (FIG. 5) is secured to one of the brackets 121 and is pivotally connected to the piston rod of a piston and cylinder assembly 123, the cylinder of which is pivotally connected to the transverse frame member 102. Thus, supply of pressure fluid to the cylinder of the assembly 123 will raise and lower the tailgate section 111. Supply of pressure fluid to the cylinder of the assembly 123 is controlled by yet another one of the valves 24, such as the valve 24C (FIG. 9).

A pair of endless conveyor chains 126 and 127 are mounted on the longitudinal frame members 113 and 114 of the tailgate section 111 so that the upper reaches of said chains move rearwardly whereby the containers can be moved onto said tailgate section. The chains 108, 109, 126 and 127 are driven by drive sprockets mounted on the shaft 112. The shaft 112 is rotatable by means of a fluid-pressure-operated motor 125 (FIG. 2) whereby said chains can be continuously moved lengthwise as above described. Supply of fluid pressure for effecting operation of the motor is controlled by still another one of the valves 24, such as the valve 24D (FIG. 9).

Figure 5:
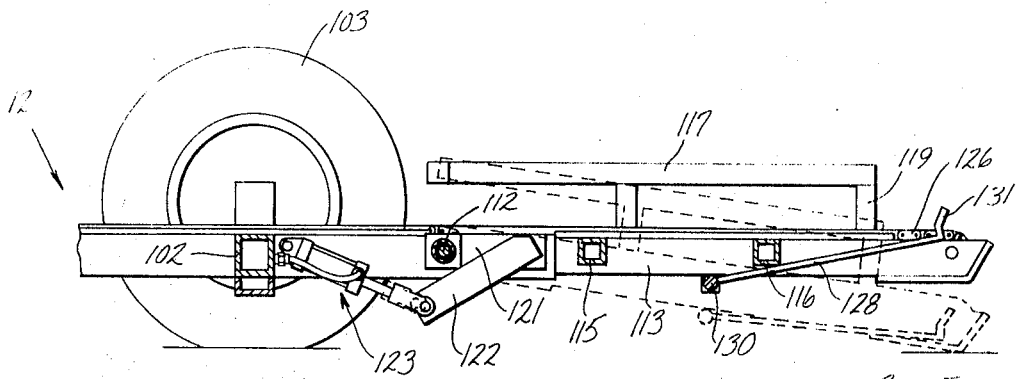
FIG. 5 is an enlarged view of a portion of FIG. 1 and showing two different positions of the tailgate portion of the trailer unit.

A pair of stop members 128 and 129 (FIG. 2) are mounted on the tailgate section 111 adjacent the rear end thereof. The forward ends of the stop members are secured to a pivotally mounted shaft 130 (FIGS. 1 and 5). The stop members 128 and 129 have upstanding extensions 131 and 132 which project upwardly above the upper reaches of the chains 126 and 127 when the tailgate section is in its raised, substantially horizontal position so that said extensions serve to retain the containers on the tailgate section when same is in the horizontal position. A crank arm 133 is connected to the shaft 130 and said crank arm is connected by a flexible inextensible element, here a chain 134, to a block 135 which is affixed to the frame member 98 of the trailer unit. The crank arm 133 is also connected by a tensioned resilient means, here a spring 137, to the frame of the tailgate section so that the spring normally urges the shaft 130 to pivot clockwise in order to position the stop members 128 and 129 in their lowered position. In the raised position of the tailgate section, the chain 134 is taut and holds the stop members 128 and 129 in their raised position. However, when the tailgate section 111 is pivoted downwardly, the chain 134 will lose tautness and the spring 137 will pivot the crank arm 133 clockwise and thereby move the stop members 128 and 129 downwardly into the retracted position as shown in broken lines in FIG. 5. Thus, the stop members 128 and 129 will be positioned in their raised, stopping position when the tailgate section is in its raised position. However, the stop members 128 and 129 will be automatically moved to their lowered, nonstopping position when the tailgate section is dropped to permit the containers to move off the trailer unit.

OPERATION

While the operation of the apparatus is believed apparent from the foregoing description, the operation will be briefly summarized to insure a complete understanding of the invention.

In the normal hauling position of the apparatus 10, the tractor unit 11 will be positioned so that the forklift mechanism 61 is positioned directly in front of the trailer unit 12 and the tractor unit can be moved in a trailing fashion when the apparatus is driven into the work area, such as an orchard. Assuming that the container to be picked up is positioned to the right of the apparatus 10 when viewed from the driver's seat as appearing in FIG. 2, the apparatus will be stopped at the desired location by manipulation of the forward-neutral-reverse control lever 40. Then the tractor unit 11 can be pivoted with respect to the trailer unit 12 by any suitable manipulation of the steering wheel 21 so that the main frame of the tractor unit is positioned substantially as appearing in solid lines in FIG. 8. The apparatus 10 can be moved forwardly or rearwardly or the tractor unit 11 can be pivoted with respect to the trailer unit 12 so as to bring the fork tines 72 into proper alignment with the container C to be picked up. Then the tractor unit 11 is moved forwardly toward the container to move the tines 72 underneath the container. The fork is then raised by actuating valve 24B and thereby applies pressure fluid to the cylinder 70. If necessary or desirable, valve 24A can be actuated to supply pressure fluid to cylinder 64 to cause backward tilting of the fork for more secure retention of the container on the fork. The tractor unit 11 can then be pivoted counterclockwise from the FIG. 8 position into the FIG. 9 position thereof wherein the fork and the container C supported thereon are positioned above the bed of the trailer unit 12. Then the fork can be lowered and made horizontal by actuation of valves 24B and 24A until the container is supported on the conveyor chains 108 and 109. Then the valve 24D is actuated to drive motor 125 to thereby move the conveyor chains 108 and 109 in order to move the container C toward the rearward end of the trailer. This will move the container off the tines 72 and the tractor unit 11 can then be swung around the vertical axis of the outer tube 78 into the driving position. It can then be advanced to the next container to be picked up and the above-described operation can be repeated. It will be apparent that the forklift apparatus 61 can pick up containers at any position on either side of or in front of the tractor unit or any position therebetween. The apparatus has great versatility and ease of movement for picking up containers which may be randomly positioned.

When the trailer unit 12 is filled with containers, then the apparatus 12 can be driven to a point for disposing of the containers. For example, the apparatus can be driven to a storage area, the tailgate 111 can be dropped by manipulation of valve 24C and actuation of cylinder 123 and the containers can be allowed to slide thereoff onto the ground. If desired or necessary, the chains 108, 109, 126 and 127 can be operated during the discharging operation to assist the unloading of the containers.

In the illustrated embodiment, three containers are placed on the trailer 12 and the discharging is effected solely off the tailgate section. If desired, the forklift mechanism 61 can be used for this purpose, in which case the chains can be driven forwardly intermittently to bring the containers to a position at the forward end of the trailer where they can be picked up by the fork. Also, four containers can be placed on the trailer 12, in which case the forklift mechanism will remain in engagement with the forwardmost container. If this is done the apparatus can be driven but the driver's seat will face the trailer unit 12.

Thus, the invention provides a highly maneuverable lifting and transporting apparatus which employs a self-propelled steerable tractor unit which is equipped with a forklift mechanism and which can be positioned in a variety of different positions in order to pick up objects disposed in a variety of different ways within a work area. The apparatus also includes a trailer unit which is provided with the capability of storing several containers thereon so that it is not necessary to move the containers to a place of storage until the trailer unit has been completely filled up. The apparatus according to the invention has great versatility and maneuverability and is well adapted for operation in orchards and the like where high maneuverability as well as adaptability to uneven terrain is required.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

We claim:

1. A load-lifting and transporting apparatus, comprising:

a self-propelled tractor unit having a steerable frame equipped with a set of driving, ground-engaging wheels, said frame having a forklift mechanism mounted on the front end thereof; and a trailer unit having a load-receiving bed, ground-engaging wheel means for supporting said trailer unit and means pivotally connecting said trailer unit to said tractor unit frame for towing and for relative pivotal movement therebetween about a vertical axis so that the forklift mechanism can be positioned in order to pick up objects which are disposed at various positions spaced from said trailer unit, following which the tractor unit can be pivoted about said pivotal connecting means with respect to the trailer unit to place the forklift mechanism in a position over the bed of the trailer unit in order to deposit the object thereon and steering means on said tractor unit for steering said tractor unit and for pivoting said tractor unit about said pivotal connecting means.

2. A load-lifting and transporting apparatus according to claim 1, in which the forklift mechanism includes an upright support frame and a load-engaging fork vertically movable along said upright frame, said upright frame being pivotally mounted on said tractor unit for pivotal movement about a horizontal axis.

3. A load-lifting and transporting apparatus according to claim 1, in which said set of driving, ground-engaging wheels on said tractor unit comprises two wheels mounted at opposite ends of an axle housing for rotation about a common, generally horizontal axis of rotation, and means mounting said axle housing on said tractor unit frame for pivotal movement therewith about said vertical axis.

4. A load-lifting and transporting apparatus according to claim 3, in which said axle housing is also mounted for pivotal movement with respect to said tractor unit frame about a horizontal axis which is transverse to the horizontal axis of rotation of the wheels of the tractor unit.

5. A load-lifting and transporting apparatus according to claim 1, in which said tractor unit frame has an internal combustion engine mounted thereon for driving the wheels of said tractor unit, said engine being mounted on the opposite side of said vertical axis from said forklift mechanism whereby said engine also serves as a counterbalance for said forklift mechanism and any load supported thereby.

6. A load-lifting and transporting apparatus according to claim 1, in which said tractor unit frame has an upright post structure coaxial with said vertical axis, and said pivotal connection comprises a beam having an end portion mounted on said post structure for relative pivotal movement.

7. A load-lifting and transporting apparatus according to claim 6, in which said upright post structure is mounted for pivotal movement relative to said trailer unit and including means connecting said post structure to said wheels of said tractor unit so that said wheels can move about said vertical axis, and a driver's seat mounted on said post structure for pivotal movement therewith.

8. A load-lifting and transporting apparatus according to claim 1, in which said trailer unit has an elongated load-supporting bed having conveying means mounted thereon for conveying objects placed thereon along said bed, said pivotal connection comprising a connecting beam having a first upwardly and sidewardly extending section extending from said vertical axis to a position adjacent one side of said bed at the forward end thereof, said beam having a downwardly and rearwardly inclined section having a lower end secured to said trailer unit adjacent said one side thereof.

9. A load-lifting and transporting apparatus according to claim 1, in which said trailer unit has a pivotally mounted tailgate portion at the rearward end thereof and means for moving said tailgate portion between a substantially horizontal position and a downwardly inclined position for discharging objects from said trailer unit.

10. A load-lifting and transporting apparatus according to claim 9, in which said tailgate portion has stop means mounted thereon adjacent the rearward end thereof and means for moving said stop means in response to pivoting movement of said tailgate portion between an upwardly projecting position for preventing objects from moving off said tailgate portion when said tailgate portion is in said horizontal position and a retracted position for allowing objects to be moved off said tailgate portion when said tailgate portion is in said downwardly inclined position.

11. A load-lifting and transporting apparatus according to claim 3, in which said vertical axis substantially intersects said horizontal axis of rotation.